United States Patent [19]

Le Craw et al.

[11] 3,845,477

[45] Oct. 29, 1974

[54] METHOD FOR CONTROLLING MAGNETIZATION IN GARNET MATERIAL AND DEVICES SO PRODUCED

[75] Inventors: Roy Conway Le Craw, Summit; Hyman Joseph Levinstein, Berkeley Heights; Raymond Wolfe, New Providence, all of N.J.

[73] Assignee: Bell Telephone Laboratories, Murray Hill, N.J.

[22] Filed: Nov. 24, 1972

[21] Appl. No.: 308,989

[52] U.S. Cl. .......................... 340/174 TF, 252/62.57
[51] Int. Cl. .......................... G11c 11/14
[58] Field of Search .......................... 340/174 TF; 252/62.57

[56] References Cited

UNITED STATES PATENTS 3,759,745 9/1973 Dixon et al. .......................... 252/62.57

OTHER PUBLICATIONS

IEEE Transactions on Magnetics; "Magnetic Properties of Flux Grown Uxiaxial Garnets" by Andrew Bobeck et al., Sept. 1971, pg. 461–463.

*Primary Examiner*—James W. Moffitt
*Attorney, Agent, or Firm*—G. S. Indig

[57] ABSTRACT

Magnetization barriers for a variety of magnetic garnets containing partial non-magnetic substitutional ions replacing iron are altered by annealing. A relatively large order change in magnetization is effected under an intimately contacting layer of silicon which may cover the entirety of a surface or which may define a particular desired pattern. Magnetization changes, either increased or decreased, of the order of 30 percent or greater, may result from annealing for periods of the order of a few minutes within the temperature range of from about 500° to 800° C. Resulting "tailored" material may be utilized in magnetic switches or memories.

14 Claims, 4 Drawing Figures

METHOD FOR CONTROLLING MAGNETIZATION IN GARNET MATERIAL AND DEVICES SO PRODUCED

BACKGROUND OF THE INVENTION

1. Field of the Invention

The invention is concerned with the modification of magnetic properties of garnet compositions in which iron is partially replaced by any of a variety of generally non-magnetic ions. Such materials are currently of interest for use in a variety of magnetic switching and memory devices, and the invention is also concerned with devices fabricated in accordance with the procedures described. One such class of devices which may utilize a thin sheet or epitaxial layer of garnet material involves the nucleation and propagation of magnetic domains evidencing a magnetic polarization opposite to that of the surrounding region of the material.

2. Description of the Prior Art

There is considerable interest in the use of magnetic compositions of the garnet structure in a variety of magnetic devices. One such class of devices which has captured the interest of many workers, sometimes designated "bubble" devices, may operate as switches or memories and may also perform a variety of logic functions. Such devices utilize thin sheets or films of magnetic material which evidence an easy direction of magnetization in a direction normal to a major surface to permit propagation of domains with polarization substantially normal to such surface. Devices of this class have now been developed to a high degree of sophistication; they may take a number of forms which may or may not involve magnetic overlay circuitry, readout circuitry, biasing fields, strip or other shape domains, etc. From a memory standpoint, particular interest results from the demonstrated capability of providing a bit density equal to or exceeding $10^6$ bits per square centimeter of surface area. Vol. MAG-5, *IEEE Transactions on Magnetics*, No. 3, p. 566, September 1969, describes some of the early work. *Scientific American*, June 1971, pp. 78–90, describes some more recent developments.

It is now well established that a material which is particularly promising for use in such devices is based on the prototypical garnet composition $Y_3Fe_5O_{12}$ (YIG). To meet desired operating conditions for the final device, materials are often modified by a partial substitution of non-magnetic ions, notably gallium or aluminum, for a portion of the iron. Both of these ions have a site preference for the magnetically dominant tetrahedral site, so that the usual effect is reduction of magnetization. Large substitutions of such ions, however, result in an increase in magnetization with increasing values corresponding with the cross-over point at which the number of iron ions in the octahedral sites equals the number of iron ions in the tetrahedral sites.

Basic material advances have been accompanied by a variety of techniques quite remarkable in their general impact. Perhaps the most significant is the development of a procedure for growing liquid phase epitaxial (LPR) films of magnetic garnets on generally non-magnetic garnet substrates with films evidencing a thickness uniformity and defect concentration sufficiently good to permit desired packing densities, Vol, 19, *Applied Physics Letters* p. 486 (1971).

Increased sophistication in emerging device designs as well as a desire for ever greater packing density have resulted in further demands being made on workers concerned with material development and treatment. Need for standardized, or at least predictable, biasing field and high bit density both result in the requirement of very close tolerance (sometimes as small as ±1 percent or less) in magnetization. Certain designs depend upon well-defined and exceedingly small patterns of increased or decreased magnetic property, for example, magnetization, within the functional magnetic film.

Critical dilution of iron sublattices by nonmagnetic ions is at once the major obstacle and the major promise with respect to both problems. While non-magnetic ion diluents invariably show some usually strong site preference, for either the tetrahedral or octahedral sites, variations in site population by such diluent ions are introduced by temperature dependence and by other processing conditions. At the same time, the fact that site preference is strengthened with decreasing temperature offers a possible mechanism by which magnetization may be locally or generally controlled.

SUMMARY OF THE INVENTION

In accordance with the invention, the magnetization of garnet samples, either bulk or epitaxial, may be adjusted within very close limits by a simple annealing procedure subsequent to growth. This procedure, which is applicable to garnets in which iron ions have been partially replaced by any of a number of non-magnetic or less magnetic ions, such as, for example, gallium, aluminum, and scandium, etc., involves a short term heating within the range of 500° to 800° C for periods which may be as short as 5 minutes. Most significant change in magnetization results in portions of the garnet underlying intimately contacting layers of elemental silicon. Annealing is generally carried out in oxygen although other non-reducing atmospheres may be utilized.

DETAILED DESCRIPTION

1. The Figures

It has been indicated that the inventive procedures are applicable to films of the type described as utilized in a variety of devices. All such devices depend on a strong growth-induced non-symmetric crystalline anisotropy resulting in a unique easy direction normal to the plane of the film and most depend upon the creation and/or movement of magnetic domains of a magnetization direction opposite to that of the surrounding region. Domain patterns in many such devices are essentially cylindrical although some may assume strip or other shape configurations. The following description is considered exemplary.

Figure 1:
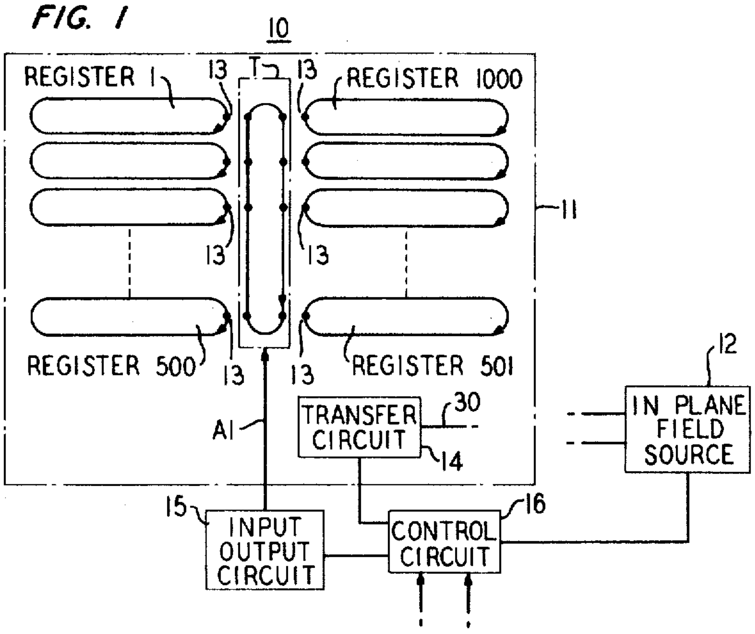
FIG. 1 is a schematic diagram of a recirculating memory utilizing an LPE grown garnet layer in accordance with the invention.
Figure 2:
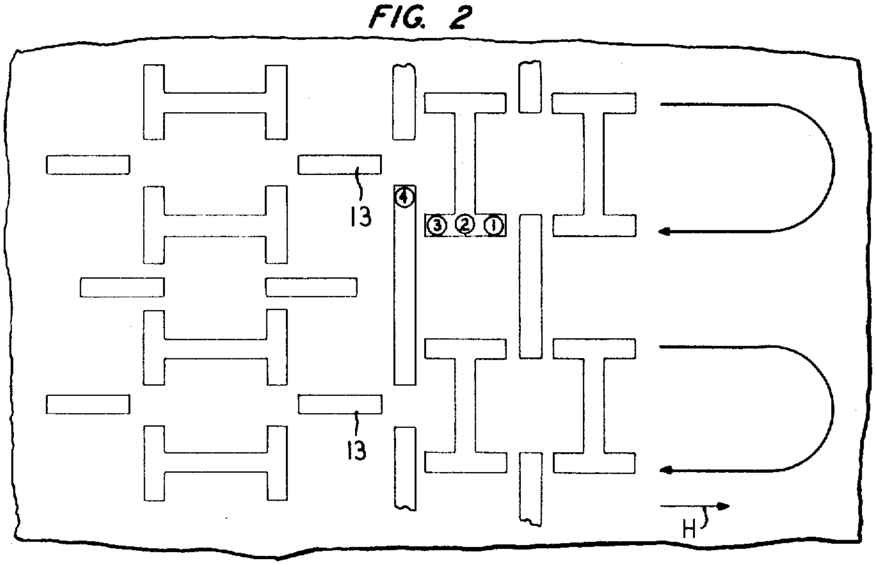
FIG. 2 is a detailed magnetic overlay and wiring configuration for portions of the memory of FIG. 1 showing domain locations during operation.

The device of FIGS. 1 and 2 is illustrative of the class of "bubble" devices described in *IEEE Transactions on Magnetics*, Vol. MAG-5, No. 3, September 1969, pp. 544–553 in which switching, memory and logic functions depend upon the nucleation and propagation of enclosed, generally (but not necessarily) cylindrically shaped, magnetic domains having a polarization opposite to that of the immediately surrounding area. Interest in such devices centers, in large part, on the very high packing density so afforded, and it is expected that commercial devices with from $10^5$ to $10^7$ bit positions per square inch will be commercially available. The device of FIGS. 1 and 2 represents a somewhat advanced stage of development of the bubble devices and include some details which have been utilized in recently operated devices.

FIG. 1 shows an arrangement 10 including a sheet or slice 11 of material in which single wall domains can be moved. The movement of domains in accordance with this invention is dictated by patterns of magnetically soft (or relatively low magnetization) regions within the magnetic garnet material which respond to reorienting in-plane fields. For purposes of description, the regions of reduced magnetizations are bar and T-shaped segments and the reorienting in-plane field rotates clockwise in the plane of sheet 11 as viewed in FIGS. 1 and 2. The reorienting field source is represented by a block 12 in FIG. 1 and may comprise mutually orthogonal coil pairs (not shown) driven in quadrature as is well understood. The "T-bar" is not shown in detail in FIG. 1. Rather, only closed "information loops are shown in order to permit a simplified explanation of the basic organization in accordance with this invention unencumbered by the details" of the implementation.

The figure shows a number of horizontal closed loops separated into right and left banks by a vertical closed loop as viewed. It is helpful to visualize information, i.e., domain patterns, circulating clockwise in each loop as an in-plane field rotates clockwise.

The movement of domain patterns simultaneously in all the registers represented by loops in FIG. 1 is synchronized by the in-plane field. To be specific, attention is directed to a location identified by the numeral 13 for each register in FIG. 1. Each rotation of the in-plane field advances a next consecutive bit (presence or absence of a domain) to that location in each register. Also, the movement of bits in the vertical channel is synchronized with this movement.

In normal operation, the horizontal channels are occupied by domain patterns and the vertical channel is unoccupied. A binary word comprises a domain pattern which occupies simultaneously all the positions 13 in one or both banks, depending on the specific organization, at a given instance. It may be appreciated, that a binary word, so represented, is fortunately situated for transfer into the vertical loop.

Transfer of a domain pattern to the vertical loop, of course, is precisely the function carried out initially for either a read or a write operation. The fact that information is always moving in a synchronized fashion permits parallel transfer of a selected word to the vertical channel by the simple expedient of tracking the number of rotations of the in-plane field and accomplishing parallel transfer of the selected word during the proper rotation.

The locus of the transfer function is indicated in FIG. 1 by the broken loop T encompassing the vertical channel. The operation results in the transfer of a domain pattern from (one or) both banks of registers into the vertical channel. A specific example of an information transfer of a one thousand bit word necessitates transfer from both banks. Transfer is under the control of a transfer circuit represented by block 14 in FIG. 1. The transfer circuit may be taken to include a shift register tracking circuit for controlling the transfer of a selected word from memory. The shift register, of course, may be defined in material 11.

Once transferred, information moves in the vertical channel to a read-write position represented by vertical arrow A1 connected to a read-write circuit represented by block 15 in FIG. 1. This movement occurs in response to consecutive rotations of the in-plane field synchronously with the clockwise movement of information in the parallel channels. A read or a write operation is responsive to signals under the control of control circuit 16 of FIG. 1 and is discussed in some detail below.

The termination of either a write or a read operation similarly terminates in the transfer of a pattern of domains to the horizontal channel. Either operation necessitates the recirculation of information in the vertical loop to positions (13) where a transfer operation moves the pattern from the vertical channel back into appropriate horizontal channels as described above. Once again, the information movement is always synchronized by the rotating field so that when transfer is carried out, appropriate vacancies are available in the horizontal channels at positions 13 of FIG. 1 to accept information. For simplicity, the movement of only a single domain, representing a binary one, from a horizontal channel into the vertical channel is illustrated. The operation for all the channels is the same as in the movement of the absence of a domain representing a binary zero. FIG. 2 shows a portion of a pattern of reduced magnetization region defining a representative horizontal channel in which a domain is moved. In particular, the location 13 at which domain transfer occurs is noted.

The reduced magnetization pattern can be seen to contain repetitive segments. When the field is aligned with the long dimension of an overlay segment, it induces poles in the end portion of that segment. It is assumed that the field is initially in an orientation as indicated by the arrow H in FIG. 2 and that positive poles attract domains. One cycle of the field may be thought of as comprising four phases and can be seen to move a domain consecutively to the positions designated by the encircled numerals 1, 2, 3, and 4 in FIG. 2, those positions being occupied by positive poles consecutively as the rotating field comes into alignment therewith. Of course, domain patterns in the channels correspond to the repeat pattern. That is to say, next adjacent bits are spaced one repeat pattern apart. Entire domain patterns representing consecutive binary words, accordingly, move consecutively to positions 13.

The particular starting position of FIG. 2 was chosen to avoid a description of normal domain propagation in response to rotating in-plane fields. Instead, the consecutive positions from the right as viewed in FIG. 2, for a domain adjacent the vertical channel preparatory to a transfer operation are described. A domain in position 4 of FIG. 2 is ready to begin its transfer cycle.

Device characteristics of concern affected by the procedures of the invention are related in known manner to the measured value of the magnetic anisotropy (the field required to rotate the direction of magnetization from the unique easy axis to the medium axis of magnetization perpendicular to the easy axis). The relationship of device parameters to this value is set forth in section 3 under the Detailed Description.

Figure 3:
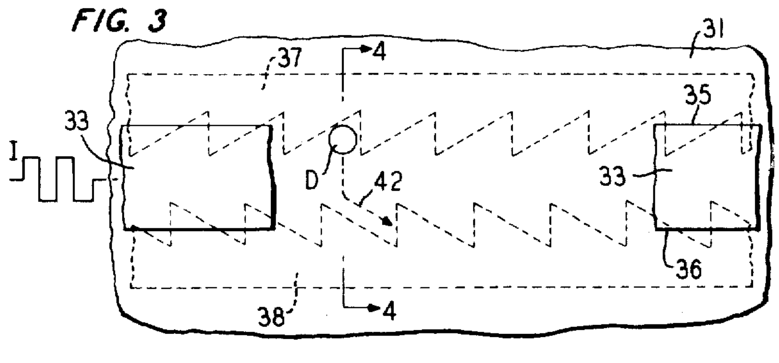
FIG. 3 is a schematic representation of a bubble propagation arrangement utilizing a well-defined pattern of altered magnetization in accordance with the invention.

The bubble device of FIG. 3 is representative of a class of devices described in copending application Ser. No. 309,506 filed Nov. 24, 1972 and now U.S. Pat. No. 3,778,788 and is illustrative of a class in which domain propagation is along a path defined by a straight line conductor. propagation is accomplished by 180° shifting of the drive field rather than by the rotation described in relation to FIGS. 1 and 2. The effect is to drive domains back and forth across a conductor against the edges of regions forbidden to the domains. Saw-tooth edges of the regions are offset so that the back and forth motion resulting from the 180 degree shifting drive field is translated into movement along the axis of the conductor. FIG. 3 shows a conductor access bubble propagation arrangement. The arrangement comprises a layer 31 of material in which magnetic bubbles can be moved. Layer 31 is composed of substituted magnetic garnet material as described elsewhere in this disclosure.

A representative domain propagation channel is defined by an electrical conductor 33 formed by photolithographic techniques adjacent a surface of layer 31. Conductor 33 has top and bottom edges 35 and 36.

Regions 37 and 38 are defined in layer 31 beneath edges 35 and 36. Regions 37 and 38 may represent lowered magnetization and are formed in accordance with the inventive technique involving annealing, generally in oxygen or inert atmosphere, with such regions 37 and 38 defined by a silicon layer retained at least during the annealing procedure. Alternatively, and depending upon the composition of layer 31, regions 37 and 38 may correspond with portions of layer 31 which was left bare with the remaining portion of the layer being covered by silicon during the inventive annealing procedure. This alternative is, as described in detail further on, effective for materials in which the number of iron ions in the octahedral sites is greater than the number of such ions in the tetrahedral sites.

Figure 4:
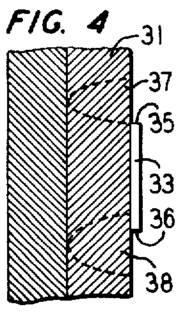
FIG. 4 is a cross-sectional view of a portion of the arrangement of FIG. 3.

FIG. 4 shows a cross-section of the arrangement of FIG. 3. Conductor 33 overlaps more of region 38 than region 37 for the particular plane 4—4' chosen.

Movement of a domain along the axis of conductor 33 is from left to right as viewed in FIG. 3 in response to current changes in the conductor.

A simplified description of bubble propagation operation follows. A bubble in a given position has its magnetization aligned with an axis normal to the plane of layer 31. For the purpose of this description, it is assumed that the magnetization is directed upward (in a positive direction) out of the plane and the magnetization of the remainder of layer 31 is directed downward into the plane. For a current flowing from right to left in conductor 33, the lower edge 36 of conductor 33 becomes attractive to the domain and the top edge repulsive. The domain responds by moving first downward and then to the right along the angled edge of region 38 to a "least energy" position along the path indicated by broken arrow 42.

A pulse of opposite polarity is operative to move the domain upward in a like manner. Accordingly, one reversal or one alternation in the current pulse in conductor 33 is operative to advance a domain one period to the right.

As discussed, the inventive effect is primarily in terms of an alteration in magnetization. Such alteration may be carried out with a view to reproducibility from sample to sample or with a view to tailoring magnetization to sqecific requirements in a particular device. As explicitly discussed in conjunction with FIGS. 3 and 4, it may be with a view to modifying magnetization, either by increasing or decreasing this parameter, in a particular portion of the device, so as, for example, to define regions within which bubbles are less easily nucleated and/or propagated.

2. The Mechanism

The inventive procedure is dependent upon a redistribution of substitutional ions as between the two crystallographic sites occupied by iron in the prototypical compound. It is well known that the net magnetic moment in YIG is 5 Bohr magnetons (corresponding with the contribution of one iron $3^+$ ion). This moment is ascribed to the difference between the oppositely polarized moments of the two octahedral iron ions on the one hand and the three tetrahedral iron ions on the other. Modification of magnetization in magnetic garnets generally takes the form of partial substitution of nonmagnetic ions for iron. Since, based on size and other considerations, such substitutional ions show a site preference which is more or less pronounced for one or the other of the iron sites, the effect of such substitution may be either to increase or to decrease net magnetic moment. In certain instances, noticeably for gallium substitution, which shows a preference for the predominant tetrahedral site, increasing the amount at first results in decreasing magnetization and finally results in increasing magnetization as the continued preference for the tetrahedral site results in a predominance of octahedral iron ions.

It is known that the degree of site preference for all substitutional ions which may partially replace iron is temperature-dependent. See, *IEEE Transactions on Magnetics*, MAG-3, No. 3, p. 509 (1967). In that reference it is also indicated that site preferences of diluent ions may be modified by long-term anneal. Accordingly, periods of the order of 6 hours were found to result in measurable change in magnetization for garnet samples of the composition $Y_5Fe_{4.23}Ga_{0.77}O_{12}$ heated at a temperature of 800° C.

The inventive procedure is considered to depend also on a redistribution of diluent ions as between the two iron sites. Accordingly, materials before processing evidence that site population representing the equilibrium distribution for growth temperature which may be in the range from 1,300° to about 800° C depending on composition and growth technique. The effect of processing in accordance with the invention is to shift the distribution always by enhancing preferential site population to values approaching the equilibrium distribution for the particular anneal temperature. Accordingly, magnetization may increase or decrease, depending upon the nature and amount of the ionic species. Consider, for example, a garnet containing gallium in an amount of up to about 1.2 per formula unit. The effect of annealing, since it increases site preference (and since gallium preferentially populates the tetrahedral site) is to reduce magnetization. The effect of annealing on samples containing larger amounts of gallium is to cause an increase in magnetization since enhancement of site preference results in an increasing predominance of octahedral iron ions. The effect of annealing is to some extent dependent both on composition and temperature.

Similar effects are observable in garnets in which iron has been partially replaced by aluminum, scandium, indium, silicon, germanium, vanadium, etc. See, *Experimental Magnetochemistry* By M. M. Schieber, 1967, p. 360, for site preferences.

The invention is based primarily on the fact that a change in magnetization corresponding with an increase in site preference in turn corresponding with the equilibrium distribution for lowered temperature (relative to growth temperature) occurs more rapidly under the silicon film. Accordingly, whereas prior workers have succeeded in producing terminal changes in magnetization only at temperatures of 800° C in periods of the order of 6 hours, equilibration for samples tested in accordance with the invention may be accomplished in similar periods at temperatures of only 500° or 600° C. While this is indeed significant in bulk tailoring of a sample, it is most significant in permitting the selective tailoring in regions defined or left bare by the silicon layer.

The mechanism proposed to explain the increase in kinetics by which equilibration is brought about more rapidly under the silicon upon annealing is premised on oxygen gettering by the silicon. Silicon in direct contact with a garnet film is oxidized thereby producing oxygen vacancies in the garnet at the interface. Oxygen vacancies so produced diffuse down through the garnet film. These vacancies lower the activation energy for transfer of gallium or aluminum or other diluent ion between octahedral and tetrahedral sites as redistribution of the gallium or aluminum or other ions occurs. Since for gallium or aluminum site preference is for tetrahedral sites, and since it is this preference which is enhanced with lowered temperature (relative to temperature at which the film was formed), the effect is to more rapidly transfer gallium or aluminum ions from octahedral to tetrahedral sites under the silicon areas. While such transfer certainly occurs in regions of the garnet not in contact with the silicon, transfer is at a very much slower rate in such positions. As indicated, this transfer may lower or increase $4\pi M$ under the silicon depending upon whether iron ions dominate in the octahedral or tetrahedral site.

3. Processing Parameters

A. Atmospheric Composition

The inventive procedure is dependent upon the effect which occurs at the silicon-garnet interface. Postulated mechanism of oxygen gettering and, therefore, of oxygen vacancies is supported by the fact that the use of a reducing atmosphere, such as hydrogen or forming gas, tends to produce the same effect on uncovered regions of the garnet film. Accordingly, it has been found desirable to operate in a non-reducing atmosphere such as oxygen or an inert gas. Most of the data reported in this description was obtained in oxygen atmosphere. It has been found, for example, that a partial pressure of hydrogen of 15 percent is sufficient to result in a site exchange rate in bared regions for similar times and temperatures approximately equal to that which occurs in the garnet portion in intimate contact with the silicon.

B. Temperature

It has been indicated also that the temperature range is from 500° to 950° C. In fact, the lower limit is dictated mainly on the basis of expediency, equilibration being possible at somewhat lower temperature although with longer anneal periods. The upper limit of 950 degrees C is dependent upon two factors. The ultimate limit concerns the possibility of decomposition of the garnet itself which, depending on composition, may proceed at a measurable rate only at temperatures in the order of 1,200° C or higher. The second criterion has to do with the growth temperature. Accordingly, the anneal temperature must be sufficiently reduced with respect to the growth temperature to permit a reasonable margin of redistribution. This temperature limit is of the order of 1,000° C. From this standpoint, it is generally desired that the anneal temperature be below 1,000° C.

C. Time

This parameter, interdependent on the other two, is generally of the order of a few minutes. Samples tested even at the low temperature end of the range have generally been brought to equilibrium over a period of a few hours. The minimum value of 5 minutes indicated is not an absolute limit. In fact, measurable changes may occur, particularly at the high temperature end of the range over a shorter period.

D. Silicon Film

The thickness of the silicon film has not been found to be critical. In general, much of the work reported herein was conducted utilizing a 2,000 angstrom thick film. Upper limit is to be dictated by expediency only, such as viewing the bubbles through the Si film. Since there is no advantage gained by operation with film thicknesses greater than about 2,000 to 3,000 angstroms when operating in oxygen or inert gas this may be considered a practical limit. Based on experimental results, using silicon layer thickness of 2,000 anstroms where annealing was carried out in pure oxygen, elemental silicon remained after anneal of the order of 60 to 90 minutes and temperatures of about 650° C (generally sufficient for most inventive operations). It is apparent that in many cases a lesser thickness will suffice even for oxidizing atmosphere. For these purposes, it is estimated that a thickness of at least 100 angstroms is sufficient. Again, the upper or maximum limit on silicon thickness is to be dictated by expendiency.

There are no special requirements as to the silicon film. It is, of course, desirable that the characteristic of the garnet film not be altered in a significant way by any impurity that may be carried in the silicon, and it is also desired that the elemental silicon be sufficiently free of oxygen or other combinable element to ensure activity in gettering oxygen from the garnet layer. For these purposes, purity levels of the order of 99 percent have been found sufficient.

4. Garnet Composition

The inventive manifestations depend upon a shift in site population for one or more ions partially replacing iron. There has been a considerable amount of work directed to such partial substitutions, and it has been demonstrated that the garnet structure may be retained while partially replacing iron with such diverse elements as Ga, Al, Sc, In, Si, Ge, V, Cr, Zr, Sn, Ru, Mn, Sb. See for example, *Experimental Magnetochemistry* by M. M. Schieber, North-Holland publishing Co.-Amsterdam, p. 360 et seq. (1967). Additional partial substitutions have been reported by S. Geller, see Bd/25, Z. Kristallographie, p. 1 (1967).

It will be noted that substitutional ions may be magnetic or nonmagnetic and that they may be of a valence state differing from that of the iron (3+). In the latter instance, valence compensation is required. As also seen in the references cited above, such compensation is accomplished by use of divalent ions such as calcium, bismuth, etc., or, alternatively, by tetravalent ions Si, Ge, etc. The cited references also indicate site references for the various substitutional ions. Many of these references indicate site preferences, and this information may be used as a guide to the expected direction of shift in magnetization resulting from use of the inventive annealing procedure.

For the inventive purposes, it is required that partial substitution of iron be at a level of at least 5 cation percent based on the total number of octahedral and tetrahedral sites (in accordance with the usual formula unit resulting in a translation of the minimum of 5 cation percent to 0.25 in such terms). The minimum limit is, of course, premised on the fact that all substitutional ions, while showing a site preference, nevertheless have some equilibrium distribution as between both sites and further that such distribution is temperature dependent. The lower limit set forth is not an absolute limit, but such minimal quantity of substitutional ion is generally required to result in a significant change in magnetic properties on annealing. It is, of course, not required that substitution be by a single ion and, in fact, where the valence state is different from 3+, compensation is sometimes conveniently accomplished within the iron sites (although compensation may also result from dodecahedral substitutions).

The upper limit for substitutional ions partially replacing iron is not rigidly fixed. In some cases, the maximum is determined by the number of substitutional ions which may be introduced without destroying the structure. In other cases, the maximum may be determined by the permissible degree of substitution for which spontaneous polarization is retained at a desired operating temperature. in general terms, other circumstances permitting, an absolute maximum for room temperature operation requires the continued presence of at least approximately 3.5 iron ions per formula unit (70 percent population of the iron sites).

A preferred embodiment is premised on the use of the substitutional ions; gallium and aluminum. Both of these ions have a site preference for the tetrahedral site thereby resulting in a decreasing magnetization (generally desired in magnetic devices now contemplated). Both are ordinarily trivalent (eliminating the need for compensating ions) and both are of such size as to permit large substitution without significantly altering the garnet structure.

5. Examples

The following examples, exemplary of an extensive series of experiments in which a variety of parameters were altered (atmospheres, temperatures, compositions, etc.,) were chosen to show (1) an overall change in magnetization and (2) a selective change in magnetization. Substrate and film composition, as well as silicon thickness and anneal conditions, were the same in both examples.

Example I

An epitaxial film of a composition represented by the formula $YGdTmFe_{4.3}Ga_{0.7}O_{12}$ of a thickness of approximately 6 micrometers on a substrate of $Gd_3Ga_5O_{12}$ was covered with a 2,000 angstrom thick silicon film produced by evaporation using an electron gun technique. With the entire surface covered with the silicon film the body was annealed in oxygen at a temperature of approximately 600° C for a period of about 30 minutes. In this particular example, the silicon film was removed by chemical etching. A uniform decrease in magnetization over the entirety of the film was observed. It was found that the magnetization reduction was from an initial value of 125 gauss to a terminal value of 82 gauss, representing a 35 percent reduction. (In other experiments, the same procedure was carried out without silicon film removal—the change in magnetization was identical.)

Example II

A 2,000 angstrom thick silicon film was produced on a film born by a substrate with all thicknesses and compositions the same as those set forth in Example I. Scalloped tracks were produced in the silicon film by ion milling with the pattern resembling that of FIG. 3. The entire body was then annealed again at a temperature of 600° C for a period of 30 minutes in oxygen. Magnetization showed the same reduction (from 125 gauss to 82 gauss) within the portions of the film covered by the silicon during annealing. Portions of the film which had been bared by milling showed no substantial change in magnetization. In this particular example, the patterned silicon film was removed by chemical etching. (Again, in other experiments, the film was not removed—magnetization change was unaffected.)

In other experiments, various shapes of tracks for magnetic bubble propagation were formed in garnet films of different compositions of thicknesses of from 2 to 10 micrometers. Various thicknesses were utilized. Inert atmospheres as well as oxygen were used. Substrates were sometimes heated (e.g., to 600° C) during Si deposition. Annealing times were varied as was annealing temperature. In many of the experiments, annealing times were from 20 minutes to 60 minutes and annealing temperature was from 575° to 700° C. Film compositions included $YEu_2Al_{0.8}Fe_{4.2}O_{12}$, $Y_{0.8}Gd_{1.2}TmGaFe_4O_{12}$, $YGdYbGaFe_4O_{12}$ and $Sm_{0.25}Y_{2.75}Ga_{1.2}Fe_{3.8}O_{12}$. Magnetization changes within the range of from 30 to 50 percent were regularly attained under these conditions. As indicated from the detailed disclosure, magnetization change can represent an increase or decrease depending upon the distribution of iron ions as between the tetrahedral and octahedral sites.

What is claimed is:

1. Method for altering a magnetic property of a body of an iron-containing composition of the garnet structure, such composition containing at least 5 cation percent of a substitutional ion other than iron in the tetrahedral and octahedral crystallographic sites based on the total number of cations in such sites, said method comprising heating of said body, characterized in that at least a portion of the said body is in intimate contact with elemental silicon during at least a portion of the said heating, in that heating is carried out in an atmosphere which is substantially non-reducing with respect to the said garnet, in that heating is carried out over the temperature range of from 500 degrees C to 950 degrees C, and in that heating is continued for a period of at least 5 minutes, up to a maximum of approximately 2 hours.

2. Method of claim 1 in which the said body is an epitaxial layer on a substrate.

3. Method of claim 1 in which said body is that of a bulk grown crystal.

4. Method of claim 1 in which the silicon is removed subsequent to heating.

5. Method of claim 1 in which the said substitutional ion is non-magnetic.

6. Method of claim 5 in which the said nonmagnetic ion is selected from the group consisting of gallium and aluminum.

7. Method of claim 1 in which only a portion of the said body is in intimate contact with the said elemental silicon.

8. Method of claim 7 in which the said elemental silicon is contained in a deposited layer.

9. Method of claim 8 in which the said deposited layer is produced by sputtering.

10. Method of claim 8 in which the said deposited layer is produced by evaporation.

11. Method of claim 10 in which net magnetization in the said body is primarily due to a predominance of iron ions in the tetrahedral sites and in which magnetization is reduced during heating preferentially in the garnet regions in intimate contact with the elemental silicon.

12. Method of claim 10 in which net magnetization in the said body is primarily due to a predominance of iron ions in the octahedral sites and in which magnetization is increased during heating preferentially in the garnet regions in intimate contact with the elemental silicon.

13. Method of claim 8 in which the said portion corresponds with the deposited pattern.

14. Method of claim 13 in which the pattern is produced photolithographically in the Si film.

* * * * *

UNITED STATES PATENT OFFICE
CERTIFICATE OF CORRECTION

Patent No. 3,845,477 Dated October 29, 1974

Inventor(s) Roy C. Le Craw, Hyman J. Levinstein and Raymond Wolfe

It is certified that error appears in the above-identified patent and that said Letters Patent are hereby corrected as shown below:

Column 1, line 64, "(LPR)" should read --(LPE)--;
Column 5, line 17, "propagation" should read "Propagation--;
Column 9, line 45, "in general terms" should read --In general terms--.

Signed and sealed this 11th day of February 1975.

(SEAL)
Attest:

RUTH C. MASON
Attesting Officer

C. MARSHALL DANN
Commissioner of Patents
and Trademarks